No. 620,726. Patented Mar. 7, 1899.
A. A. WOOD.
GIN SAW GUMMING MACHINE.
(Application filed Dec. 4, 1897. Renewed Feb. 8, 1899.)

(No Model.) 4 Sheets—Sheet 1.

WITNESSES
INVENTOR
ALBERT A. WOOD,
BY
ATTORNEYS.

No. 620,726. Patented Mar. 7, 1899.
A. A. WOOD.
GIN SAW GUMMING MACHINE.
(Application filed Dec. 4, 1897. Renewed Feb. 8, 1899.)
(No Model.) 4 Sheets—Sheet 2.

WITNESSES
H. S. Wesson
Dan W. Toby

INVENTOR.
ALBERT A. WOOD
BY
A. A. Wood & Son
ATTORNEYS.

No. 620,726. Patented Mar. 7, 1899.
A. A. WOOD.
GIN SAW GUMMING MACHINE.
(Application filed Dec. 4, 1897. Renewed Feb. 8, 1899.)

(No Model.) 4 Sheets—Sheet 3.

WITNESSES
H. S. Wesson
Dan W. Iby

INVENTOR.
ALBERT A. WOOD,
BY
A. A. Wood Son
ATTORNEYS.

THE NORRIS PETERS CO., PHOTO-LITHO., WASHINGTON, D. C.

No. 620,726. Patented Mar. 7, 1899.
A. A. WOOD.
GIN SAW GUMMING MACHINE.
(Application filed Dec. 4, 1897. Renewed Feb. 8, 1899.)

(No Model.) 4 Sheets—Sheet 4.

WITNESSES
H. S. Wesson
Dan W. Ely

INVENTOR.
ALBERT A. WOOD,
BY
A. A. Woodson
ATTORNEY

THE NORRIS PETERS CO., PHOTO-LITHO., WASHINGTON, D. C.

UNITED STATES PATENT OFFICE.

ALBERT A. WOOD, OF ATLANTA, GEORGIA.

GIN-SAW-GUMMING MACHINE.

SPECIFICATION forming part of Letters Patent No. 620,726, dated March 7, 1899.

Application filed December 4, 1897. Renewed February 8, 1899. Serial No. 704,989. (No model.)

*To all whom it may concern:*

Be it known that I, ALBERT A. WOOD, a citizen of the United States of America, and a resident of Atlanta, in the county of Fulton and State of Georgia, have made a certain new and useful Improvement in Gin-Saw-Gumming Machines; and I do hereby declare the following to be a full, clear, and exact description of the invention, reference being had to the accompanying drawings, and to letters of reference marked thereon, which form a part of this specification.

This invention relates to devices for sharpening the saws of cotton-gins, being for the purpose of performing the step therein known as "gumming," which consists in removing a portion of the metal at the bottom of the interdental spaces, whereby the teeth are restored to their proper length, angle, and shape.

The invention consists of the novel elements and combinations thereof, as hereinafter set forth.

The device in one of its forms is shown in the accompanying drawings as follows:

Fig. 4 is a plan of the lower portion of the frame, in which the left-hand portion of Fig. 3 is repeated to show the connection of the several parts. Fig. 5 is a side elevation of the parts shown in Fig. 4. For convenience and to conform to the nomenclature usually employed by the manufacturers of gin-sharpening machines the part that rests on the space-blocks of the gin (shown in Fig. 5) will be called the "stand" and the part carrying the file-shaft (shown in Fig. 3) will be called the "frame." The part that connects the frame with the stand (shown in the left end of all three figures) will be called the "hinging-piece. " Fig. 6 is a vertical cross-section on the line 6 6, Fig. 5. Fig. 7 is a vertical cross-section on the line 7 7, Fig. 5. The remaining figures will be on an enlarged scale, the scale being about double that of those already described.

Figures 1, 2:
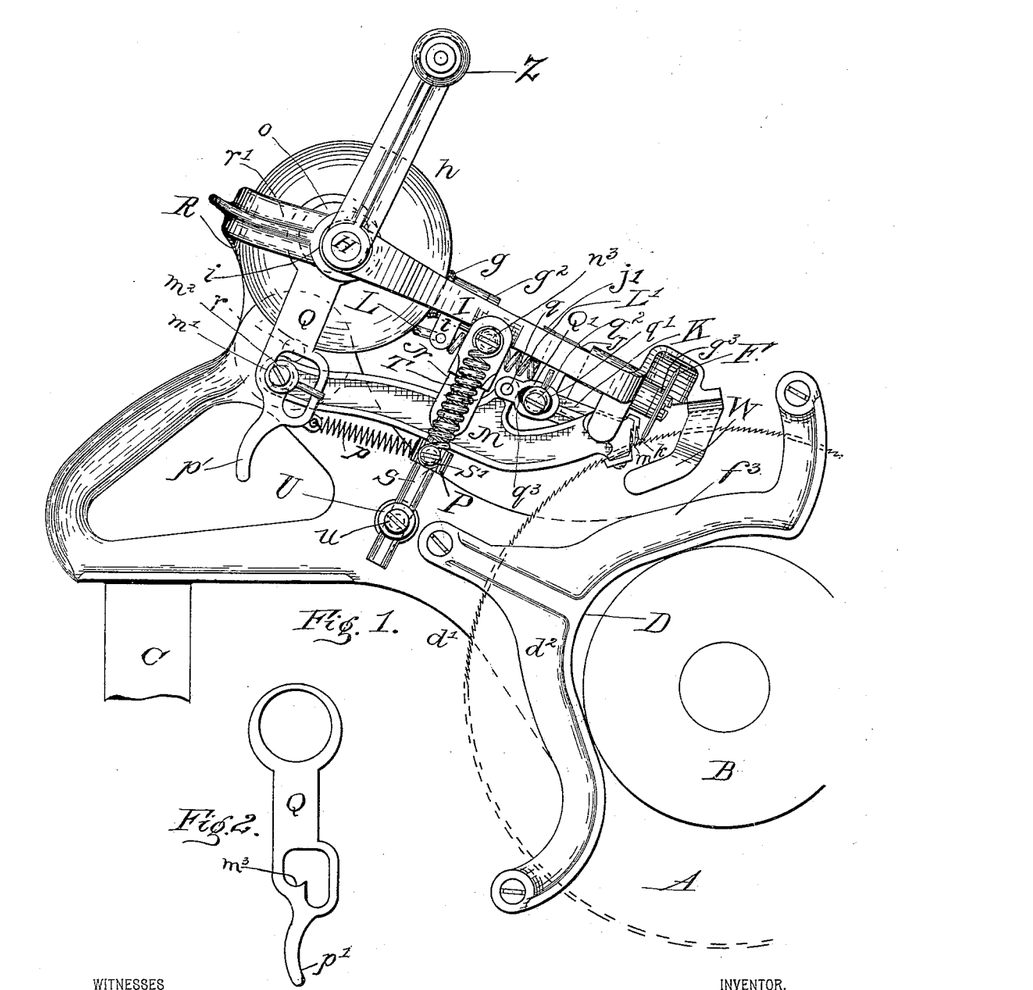
Figure 1 is a side elevation of the machine, showing also a saw and space-block and, in rudimental form, a support for the rear end of the machine. The machine is shown in this figure in its normal position when at work. All the remainder of the figures will be shown on the plane of the file-shaft, when they will be said to be "in plan" or "in elevation" or will be said to be "vertical.
" Fig. 2 is a detail showing the form of the feed-lever pitman.
Figures 4, 5, 6, 7:
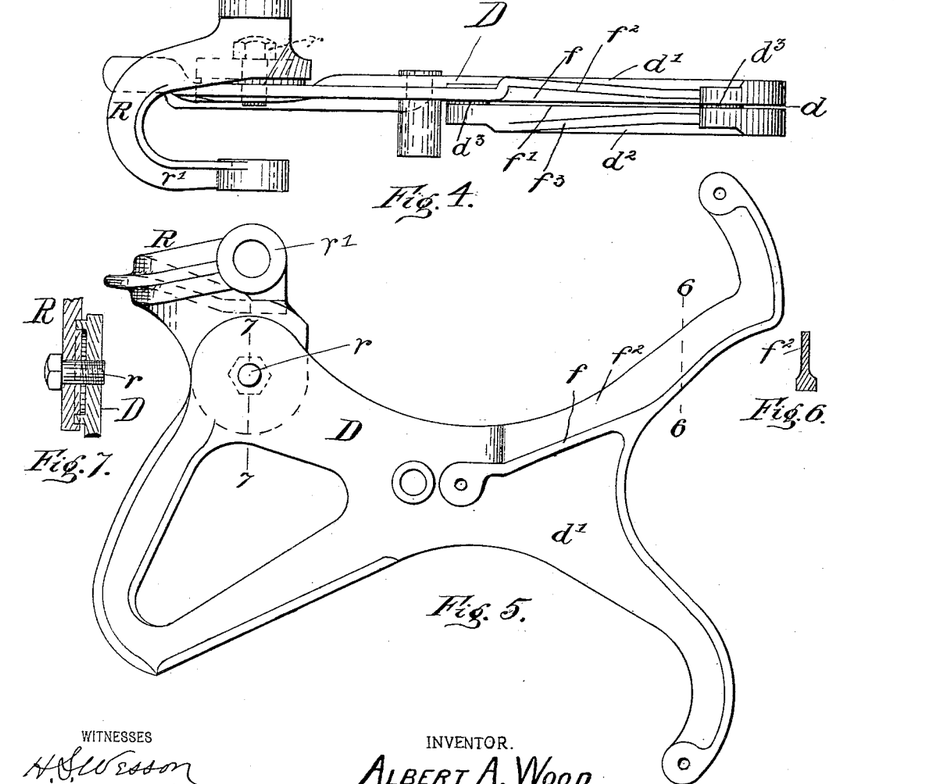

In Fig. 1, A is a saw, and B is a space-block, of a cotton-gin. The saws and space-blocks are alternated, as is usual in cotton-gins, thus forming a saw-cylinder, and the stand D has a slit *d* in its forward or bifurcated end, as best shown in Fig. 4, and rests on the space-block B, the saw passing through the slit, as shown in Fig. 1. The rear end of the stand rests on a support C, which may be a trestle or other convenient abutment.

Figure 3:
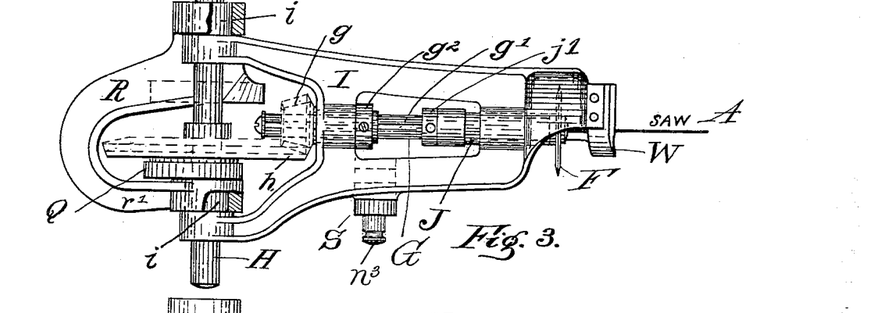
Fig. 3 is a plan of the file and file-shaft and the parts of the frame on which they are directly carried.
Figure 8:
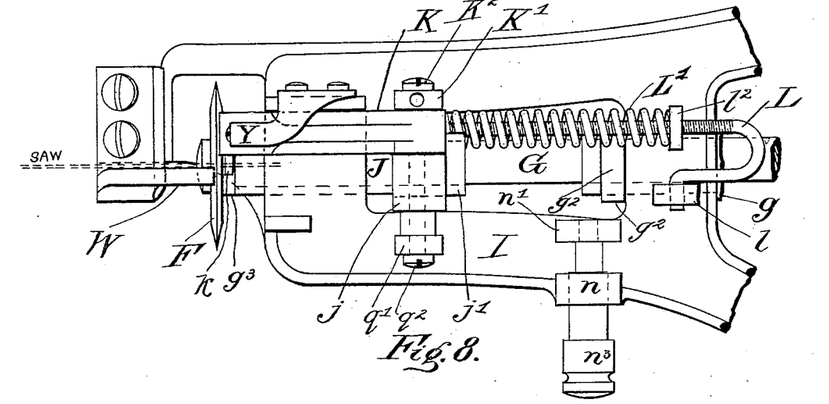
Fig. 8 is a bottom view of a portion of the frame, showing the file, the file-shaft, the retaining-pawl, the spring that presses the file forward to engage new teeth, and the abutting piece that supports the saw against lateral movement while being operated upon.
Figure 9:
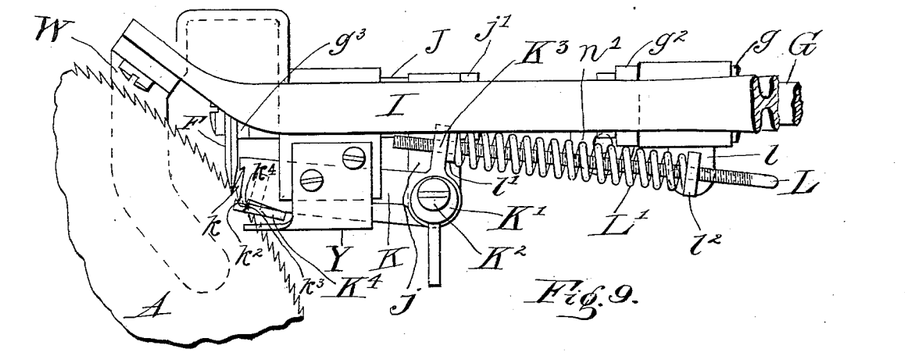
Fig. 9 is a side elevation of the parts shown in Fig. 8 with the addition of a part of a saw.
Figure 10:
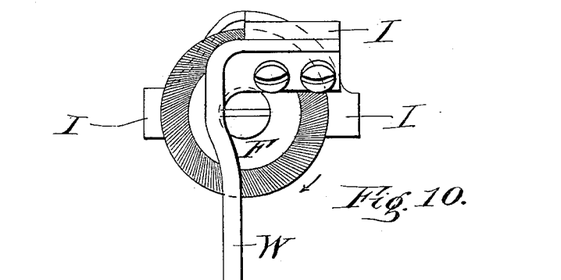
Fig. 10 is an elevation of the left-hand end of Figs. 8 and 9.
Figures 11, 12, 13, 15, 16, 17:
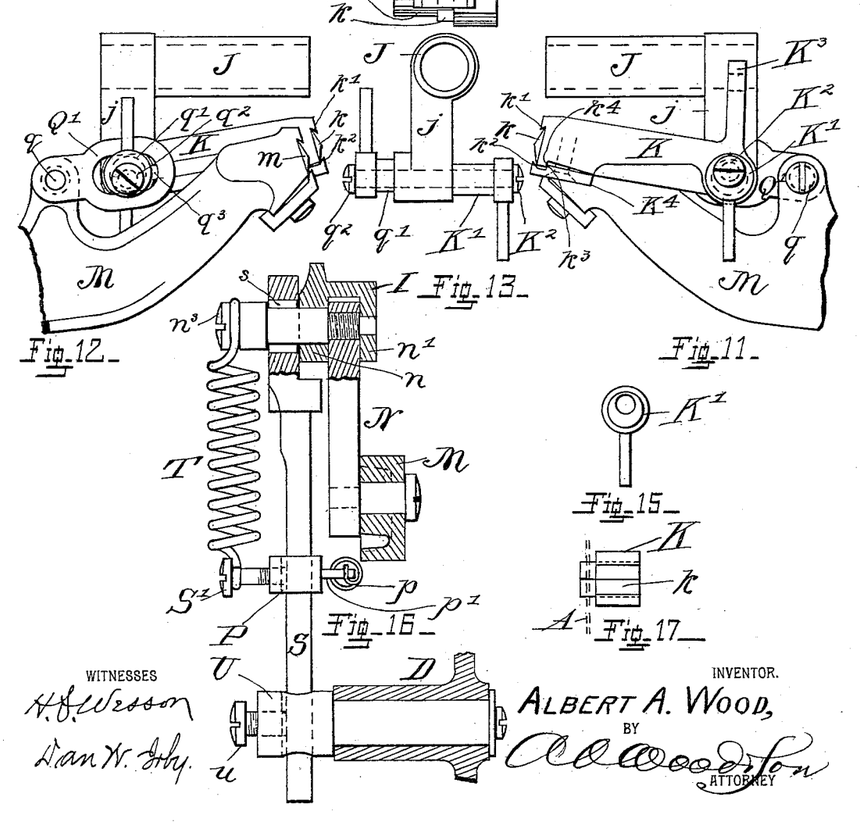
Fig. 11 shows the forward end of the retaining-pawl and feed-lever and the sliding journal-bearing box that carries the file-shaft and retaining-pawl in side elevation.
Fig. 12 shows the same parts as Fig. 11, but the opposite side, showing also the link connection of the feed-lever to the sliding journal-bearing box.
Fig. 13 is an end view of the sliding journal-bearing box, showing the eccentric bushings by which the retaining-pawl and the link of the feed-lever are attached to the downward projection on said sliding journal-bearing box.
Fig. 15 is an end view of one of the eccentric bushings that are shown in Fig. 13.
Fig. 16 is a detail showing an adjustable connection that, with the hinging-piece, connects the frame to the stand. It also shows the spring that gives the pressure to the file and the connection of the feed-lever to the frame.
Fig. 17 is a view of the beveled side of a feed-bit.

The operation to be performed by this machine is the gumming out or deepening of the teeth of gin-saws after they become worn by filing with a rotary file F, which is best shown in Figs. 8, 9, and 10. In Figs. 8 and 9 it will be seen that the file is beveled to fit between the teeth and is cut, as shown in Fig. 10, on both sides. It should also be cut on the edge, as is usual with knife-edge files. The rotary file is carried on a shaft G, which is driven through the gears $g$ and $h$ by the hand-crank shaft H. The shafts and gears just described are carried on the frame I, as shown in Fig. 3, the shaft H passing through the trunnions $i$ and the shaft G through the sliding journal-bearing box J and being reciprocable through the gear $g$, by which it is driven by means of a feather or spline in the groove $g'$. The hub or boss of the gear $g$ forms a journal-bearing in the frame and is held in position in the frame by the set-collar $g^2$. A similar set-collar $j'$ on the shaft G, together with the collar $g^2$, prevents the racing of the shaft in the sliding journal-bearing box J and causes it to be carried longitudinally with said bearing-box. To one side of the downward projection $j$ is journaled the retaining-pawl K, Figs. 8, 9, 11, 12, and 14. This journal is formed by the eccentric bushing $K'$, which is rotatable on the screw $K^2$. On the forward end of the retaining-pawl is a bit $k$, that engages the saw-teeth, as shown in Fig. 9. This bit should be made of steel and be tempered, one side being flat and the other being beveled on the top and bottom edges, as shown. In length it should be sufficient to reach across the part marked K and project sufficiently to reach across and beyond the saw A, as shown in Figs. 8 and 17. This bit $k$ is attached by means of the dovetailed recess formed by the beveled shoulders $k'$ in the part K and $k^2$ in the strap $K^4$. The strap $K^4$ is also grooved, forming a shoulder $k^3$, that abuts against the shoulder $k^4$, as shown in Figs. 9 and 11, and that is held by the screw passing through the strap into the pawl K. This retaining-pawl has two principal functions—first, to locate the file over the interdental space to be gummed, and, second, when the gumming is finished to guide the file in its upward movement, so that it will not touch and roughen the sides of the teeth—i.e., the surfaces just filed—nor contact with and blunt the sharpened teeth. The first function is properly performed as follows: The file-shaft has, as before specified, endwise motion, and the retaining-pawl K is fulcrumed on the arm $j'$, movable with said shaft. Hence it is obvious that when the bit $k$ permits the shaft to move forward and stops such forward movement by dropping into the interdental space next in succession the file will also drop into the interdental space next in succession relative to it; also, inasmuch as the said bit $k$ moves in a plane (practically a plane) parallel to the plane of the file the distance between these planes will not vary no matter how deep the interdental space in which said bit $k$ rests is relatively to the interdental space in which the file then rests. If the distance between these planes does not vary, a tooth or more may be brought to a good point without changing the interdental intervals—that is, the pitch of the teeth. If this result did not take place in a gummer, the teeth would be so gummed as to be of different lengths and different pitch, and the circularity of the saw would be destroyed; but in my device the saw is kept in a true circle, the teeth kept of the same pitch, and a broken tooth can by successive gummings be brought up to the general periphery. The necessity for a device of this kind in a gummer will be best appreciated when the fact is considered that the feeding of any machine is necessarily slightly irregular, especially in gin-saws which have been hand-gummed or hand-filed. The second function—i.e., that of preserving the finished surfaces and point from injury by the file—is due to the fact that the file in lifting from a finished interdental space lifts slightly before the abutting piece or finger Y contacts with the retaining-pawl and starts it lifting, thereby freeing the file from contact with the saw, the bit $k$ following, as it is lifted, the long side of the tooth and causing the file to move out of its interdental space parallel to and a short distance from the long side of the tooth, and when the said bit $k$ will pass over the point of a tooth the edge of the rotating file is obviously free of the point of the tooth over which it is to pass.

The arm L, formed of a bent wire and pivoted in the lug $l$ on the frame, passes through a hole in the upward projection $K^3$ on the retaining-pawl, as shown in Fig. 9. On this arm is a spring $L'$, acting as a pressure-spring between the loose washer $l'$ on the upward projection and the nut $l^2$, which is screwed onto the arm and acts as a pressure adjustment. A return-bend is formed in the arm L to permit of a long spring in order to provide for a practically uniform pressure without reference to the position of the sliding journal-bearing box and its connected elements.

The feed-lever M is fulcrumed on a link, preferably a pendulous arm N, and has on its forward end a bit $m$, Figs. 1 and 12, in form and means of attachment similar to the bit described as being on the retaining-pawl and engages the saw-teeth to turn the saw, as will be described. On the rear end of the feed-lever is an eccentric bushing $m'$, that is attached by and is rotatable on the screw $m^2$. The feed-lever is operated through a pitman Q, the upper end of which is journaled on the eccentric $o$ on the gear $h$, and the lower end has an L-shaped slot that is best shown in Fig. 2. The connection between the eccentric and the feed-lever is by the shoulders $m^3$, Fig. 2, resting against the eccentric bushing $m'$, which position is assured by the pulling-spring $p$, one end of which is attached to the pitman Q and the other to a stud $p'$ in the vertically-adjustable collar P, as shown in Fig. 16. It is not essential that this spring be attached to this collar, but only that it have some practically fixed attachment.

The link Q', Figs. 1 and 12, connects the feed-lever M to the downward projection $j$ on the sliding journal-bearing box J, being attached to the lever by a shoulder-screw $q$, Fig. 11, and to the downward projection $j$ by an eccentric bushing $q'$ and the screw $q^2$. While the feed-lever M by its bit $m$ engages the teeth of the saw, the slot $q^3$ in the link Q' will limit the forward movement of the sliding journal-bearing box and consequently the retaining pawl and file, as will be hereinafter explained.

By reference to Figs. 1 and 3 it will be seen that the frame I is hinged to the hinging-piece R by the trunnions $i$, one of which enters a laterally-projecting arm $r'$. This hinging-piece is attached to the stand by a cap-screw $r$, (shown in Figs. 4, 5, and 7,) holding the annular disk on the stand, as shown in section in Fig. 7. The hinging-piece revolves on the joint last described for the purpose of adjusting the position of the frame forward or backward, as might be required and as will be described. The frame I being hinged at its rear end, as described, the position of its free or forward end is governed by the rod S, extending from it to the partially-rotatable stud U in the frame, as shown in Figs. 1 and 16. On the frame are two downwardly-projecting lugs $n$ and $n'$, Figs. 8 and 16, and between those lugs goes the pendulous arm N, on which the feed-lever is fulcrumed. The screw $n^3$ is screwed into the link or pendulous arm and forms journals in the lugs $n$ and $n'$, passes through the rod S, with a shoulder at its outer side, and has a groove in its head for the pulling-spring T. The screw $n^3$ passes through a slot $s$ in the upper end of the rod S, as shown in Fig. 16, the upper end of the slot $s$ limiting the lift of the frame and with it the file as the file passes from one tooth to another, while the bottom end of the slot is a clearance, the downward abutment being the saw, contacted with by the file at the free end of the frame instead of the lower end of the slot. The pulling-spring T is attached at its lower end to a screw or stud S' on the collar P, that is vertically adjustable on the rod S and operates to depress the frame and press the file against the saw. The frame being hinged, as described, is adjusted as to height by swinging on said hinge and being fastened in the desired position by clamping the rod S in its hole in the stud U by the screw $u$. On the forward or free end of the frame is a downwardly-projecting abutment-arm W, that supports the saw against lateral deflection while being operated upon by the file. The file runs in the direction indicated by the arrow in Fig. 10.

By reference to Figs. 4 and 5, in connection with Fig. 1, it will be observed that the stand D consists of the parts $d'$ and $d^2$ and that they are screwed together, with spacing-washers $d^3$ to form an opening through which the saw passes. It is found by experience that when saws are in bad condition, requiring sharpening, they generally carry some gum and lint, which on the saws being rotated for the purpose of presenting the different teeth to be operated upon will be scraped off by the inwardly-projecting flanges $f$ and $f'$, which necessarily contact with the saw for the purpose of maintaining the machine in its proper position. These flanges therefore slope downwardly, as shown in Fig. 5, in the direction in which the saws are turned while being operated upon and tend to scrape off the gum and lint and by reason of the divergence of the flanges $f^2$ and $f^3$ the lint and gum will be carried away from the saws and discharged off the stand.

The machine is adjusted and operated as follows: The bifurcated portion of the stand is placed over the saw and rests on the space-blocks, as shown in Fig. 1, the rear end resting on any suitable support. Notice should then be taken as to whether the file stands at the correct angle to the saw—that is to say, whether it will file teeth of the correct shape or angle. If a change of angle is necessary, the cap-screw $r$ and the screw U should be loosened, which will permit the frame to be moved forward or back and also allow its vertical adjustment. It will then be easy to locate the file at such place on the periphery of the saw as will give the required angle to the teeth, which being done both of said screws should be tightened. Next, if necessary, the retaining-pawl K should be adjusted by turning the eccentric bushing K' until the bit $k$ exactly engages a tooth near the file, preferably the next to it, when the bushing should be tightened by the screw $K^2$. The periphery of the saws sometimes becomes radially irregular from wear and sharpening. The file therefore is permitted lateral movement by the mechanism consisting of the sliding journal-bearing box J and its connection with the file-shaft G. The retaining-pawl by reason of its connection with the sliding bearing-box J will always maintain a uniform distance from the file, and its function is to engage a tooth that has been gummed by the file and cause the file to work in the proper place. Sometimes a broken tooth would otherwise cause the file to be deflected from its proper position. As the forward end of the frame and file is lifted, as will be hereinafter described, the bearer Y, that extends under the retaining-pawl K, as shown in Figs. 8 and 9, lifts the retaining-pawl when the frame is lifted, which permits the file and pawl each to pass over one tooth and engage the next. Whenever the retaining-pawl is lifted by the bearer it will contact with the bearer at the rear end of the strap $K^4$. It will be observed that the drawing back of the retaining-pawl K to suit saws of the coarser pitch by turning its eccentric bushing K' will lift the rear end of said pawl and permit the bit $k$ to drop lower relatively to the file, as would be made necessary by its greater distance from the file. There is normally a slight space between the bearer Y and its point of contact with the strap K⁴ of the retaining-pawl K to insure the seating of the bit $k$ notwithstanding slight irregularities in the teeth, but not sufficient to provide for teeth of much coarser pitch. The sliding journal-bearing box J, with its connected parts, is carried forward by the spring L' until stopped by the slot in the link Q', as will be hereinafter described, this spring also acting to cause the proper seating of the bit $k$.

It will be observed by reference to Fig. 9 that the pivotal point of the pawl K is so placed as to cause the vibratory movement of the retaining-bit $k$ to be substantially in a plane at a right angle to the axis of the file or parallel to the plane of said file. This movement to be exact is along a short curve, the chord of which is substantially parallel to the plane of the file. The result of this is that where one tooth is cut deeper than others it will not affect the position of the retaining-pawl relative to the file and so will not alter in the slightest degree the pitch of the teeth or cause the file to work more than is proper upon either the front or back sides of any tooth.

The feeding mechanism is shown in Fig. 1, details only being shown in other figures. The feed-lever M being pivoted to the link or pendulous arm N is actuated by the eccentric $o$ through the pitman Q. The spring $p$ acts to keep the shoulder $m^3$ on the pitman in engagement as long as it is desired to feed a tooth as often as the hand-crank Z makes a revolution. Whenever it is desired to allow the file to dwell longer than one revolution of the hand-crank, the pitman Q is pulled back, causing a disengagement of the pitman and the lever by the projection $p'$ and held as long as it is desired to have the file work on one place. Whenever the pitman Q is released, the spring $p$ will cause a reëngagement and will also cause the feed-lever M to swing forward whenever its bit is disengaged. The eccentric $o$ on the gear $h$ has a greater throw than is necessary to produce the movement of the lever necessary to feed one tooth, which excess of movement is provided for or lost by having the opening that engages the feed-lever larger in the line of its movement than the eccentric bushing $m'$ on the feed-lever M. The excess of throw in the eccentric is for the purpose of giving the lever a sufficient movement to feed the saw one tooth with only a part of half of a revolution. The lever being attached to the link or pendulous arm N is free to move back and forth as is necessary to retain the bit $k$ in contact with the saw.

Figure 14:
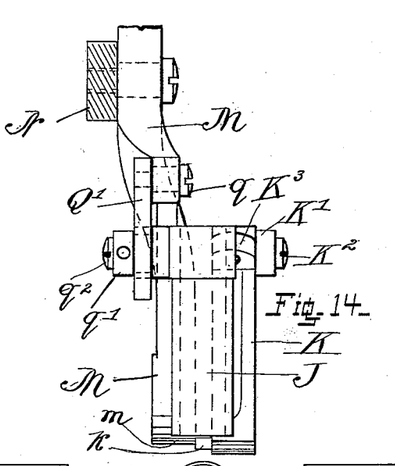
Fig. 14 is a plan of the parts shown in Figs. 11, 12, and 13.

The feed-lever M in Fig. 1 is shown in engagment by its bit with the saw and in a tooth next the retaining-pawl. While in such engagement, the saw is fed down one tooth by the continued movement of the eccentric $o$. The first effect, however, is to lift the frame I, by reason of the pendulous arm being connected thereto, until its upward movement is stopped by the screw $n^3$ contacting with the upper end of the slot $s$, as shown in Fig. 16. Of course this upward movement of the frame lifts the file and the retaining-pawl out of contact with the saw and permits the continued movement of the feed-lever to turn the saw downward the required distance. After the feed-pawl shall have moved in the direction just described and before it returns the continued movement of the eccentric will permit the frame to descend until the file and the retaining-pawl engage their respective teeth, after which it will return and engage the tooth next the retaining-pawl. Whenever the file and the retaining-pawl shall be lifted out of the teeth, as just described, they will be free to be moved forward by action of the spring L', as has been described, their forward movement being limited by the contacting of the eccentric-bushing $q'$, that is attached by a screw to the downward projection on the sliding bearing J, with the slot in the link Q', as shown in Figs. 1, 12, and 14. Consequently the eccentric-bushing $q'$ should be so adjusted by turning as to permit the file and the retaining-pawl to move forward only so far as will cause them to enter the desired teeth on descending. It will be seen that the feed-pawl will accommodate itself to variations in the radius of the saw by reason of being attached to the link or pendulous arm N and that the file and retaining-pawl will follow it or be kept in the proper relative position to it within the limit of movement of the sliding journal-bearing box. As has been said, the eccentric $o$ first lifts the frame and then feeds forward the saw. The eccentric-bushing $m'$ should be so adjusted by turning as to cause the movement of the feed-lever M to cease as soon as the saw shall have been fed a sufficient distance to allow the file and the retaining-pawl to pass over the teeth. Any greater lift would keep the file away from its work a longer time than necessary.

The pressure of the file on the saw is governed by the pulling-spring T and is regulated by moving the position of the collar P, to which the spring is attached, up or down on the rod S.

Having thus described my invention, what I claim as new, and desire to secure by Letters Patent of the United States, is—

1. In a gin-saw gummer, a stand, bifurcated and adapted to contact with the periphery of the space-blocks and slitted to receive the saw, and flanges projecting from each side of said slit and adapted to contact with the sides of the saw, for the purpose specified.

2. In a gin-saw gummer, a stand, bifurcated and adapted to contact with the periphery of the space-blocks and slitted to receive the saw, and flanges projecting from each side of said slit, said flanges being inclined downwardly as they extend from the center of the saw, and adapted to contact with the sides of the saw, for the purpose specified.

3. In a gin-saw gummer, as a means of supporting the frame adjustably on the stand, the combination of said stand adapted to engage the space-block, a disk on the side of its upper part, a hinging-piece pivotally secured to said disk, and having an arm projecting laterally therefrom, and the frame fulcrumally mounted between said hinging-piece and the end of its arm, substantially as specified.

4. In a gin-saw gummer, the combination of a stand adapted to engage the saw-cylinder, a hinging-piece having a laterally-projecting arm and being pivotally secured in substantially an upright position to said stand, holes bored through said hinging-piece and the end of its arm concentrically, a frame semirotatably attached thereto having arms on its back end, a trunnion on each of said arms projecting concentrically in the same direction and adapted to enter and be semirotatably secured therein, all for the purpose specified.

5. In a gin-saw gummer, the combination of a stand adapted to engage the saw-cylinder, a hinging-piece having a laterally-projecting arm and being pivotally secured in substantially an upright position to said stand, and holes bored concentrically through said hinging-piece and the end of its arm, a frame having arms on its back end, a trunnion on each of said arms projecting concentrically in the same direction and adapted to enter and be semirotatably secured therein, a main shaft rotatably mounted in said trunnions, a file-shaft at a right angle thereto and mounted in said frame, a gear on each shaft, and means for securing a circular file to said file-shaft and of causing the saw-cylinder to rotate and successively present each tooth to the action of the said file.

6. In a gin-saw gummer, a stand, a vertically-movable frame thereon, a file-shaft mounted rotatably in said frame so as to have longitudinal motion therein and adapted to hold a circular file on its end, and means for limiting the forward movement of said file-shaft in locating the file in an interdental space consisting of a vertically-movable retaining-pawl adapted to successively contact with the saw-teeth and mounted in operative relation to said shaft so as to follow its axial movement and be vertically vibratory along a curve the chord of which is substantially parallel to the plane of said file and means for rotating the saw-cylinder to present the saw-teeth successively to the file.

7. In a gin-saw gummer, a stand, a vertically-movable frame thereon, a file-shaft mounted rotatably in said frame so as to have longitudinal motion therein and adapted to hold a circular file on its end, and means for limiting the forward movement of said file-shaft in locating the file in an interdental space consisting of a vertically-movable retaining-pawl adapted to successively contact with the saw-teeth and mounted in operative relation to said shaft so as to follow its axial movement and be vertically vibratory along a curve, the chord of which is substantially parallel to the plane of said file, and means for pressing said file and retaining-pawl forwardly, and the latter downwardly and means for rotating the saw-cylinder to present the saw-teeth successively to the file.

8. In a gin-saw gummer, a stand adapted to hold the machine in operative relation to the saws, a frame hinged thereon so as to be vertically movable, a circular file rotatably mounted near the free end of said frame so as to have motion axially, a pendent arm secured to said file-mounting and adapted to follow it in the axial movement of the file, a pawl fulcrumed on said pendent arm and adapted to engage a tooth of the saw and a spring acting to force said file-mounting forwardly and feed mechanism adapted to rotate the saw for the purpose specified.

9. In a gin-saw gummer, a stand adapted to hold the machine in operative relation to the saws, a frame hinged thereon so as to be vertically movable, a circular file rotatably mounted near the free end of said frame so as to have motion axially, a pendent arm secured to said file-mounting and adapted to follow it in the axial movement of the file, a pawl fulcrumed on said pendent arm and adapted to engage a tooth of the saw next below the one to be gummed, and a spring acting to force said file-mounting forwardly and feed mechanism adapted to rotate the saw, for the purpose specified.

10. In a gin-saw gummer, a stand adapted to hold the machine in operative relation to the saws, a frame hinged thereon so as to be vertically movable, a circular file rotatably mounted near the free end of said frame so as to have motion axially, a pendent arm secured to said file-mounting and adapted to follow it in the axial movement of the file, an eccentric-sleeve rotatably mounted on said pendent arm and a pawl fulcrumed on said eccentric-sleeve and adapted to engage a tooth of the saw, and a spring acting to force said file-mounting forwardly and feed mechanism adapted to rotate the saw for the purpose specified.

11. In a gin-saw gummer, a stand adapted to hold the machine in operative relation to the saws, a frame hinged thereon so as to be vertically movable, a circular file rotatably mounted near the free end of said frame so as to have motion axially, a pendent arm secured to said file-mounting and adapted to follow it in the axial movement of the file, a pawl fulcrumed on said pendent arm and adapted to engage a tooth of the saw, an upright $K^3$ on said pawl and a spring $L'$ bearing on said upright and acting to force said file-mounting forwardly and at the same time forcing said pawl downwardly into engagement and feed mechanism adapted to rotate the saw, for the purpose specified.

12. In a gin-saw gummer, a stand adapted to hold the machine in operative relation to the saws, a frame hinged thereon so as to be vertically movable, a circular file rotatably mounted near the free end of said frame so as to have motion axially, a pendent arm secured to said file-mounting and adapted to follow it in the axial movement of the file, a pawl fulcrumed on said pendent arm and adapted to engage a tooth of the saw, an upright on said pawl, a wire secured to the frame and passing through said upright and a spring mounted on said wire with one end bearing against said upright and the other against an adjusting-nut on said wire and acting to force said file-mounting forwardly and at the same time force said pawl downwardly into engagement and feed mechanism adapted to rotate the saw for the purpose specified.

13. In a gin-saw gummer, a stand adapted to hold the machine in operative relation to the saws, a frame hinged thereon so as to be vertically movable, a circular file rotatably mounted near the free end of said frame so as to have motion axially, a pendent arm secured to said file-mounting and adapted to follow it in the axial movement of the file, a pawl fulcrumed on said pendent arm and adapted to engage a tooth of the saw, a spring acting to force said file-mounting forwardly, feed mechanism adapted to rotate the saw, an eccentric-bushing on said pendent arm and a slotted piece in operative relation to the feed mechanism so as to move synchronously therewith with its slot encircling said eccentric-bushing, for the purpose specified.

14. In a gin-saw gummer, a stand adapted to hold the machine in operative relation to the saws, a frame hinged thereon so as to be vertically movable, a circular file rotatably mounted near the free end of said frame so as to have motion axially, a pendent arm secured to said file-mounting and adapted to follow it in the axial movement of the file, a pawl fulcrumed on said pendent arm and adapted to engage a tooth of the saw, a spring acting to force said file-mounting forwardly, an inclined abutment under said pawl adapted to lift same upon its retraction and feed mechanism adapted to rotate the saw, for the purpose specified.

15. In a gin-saw gummer, a stand adapted to hold the machine in operative relation to the saw-cylinder, a frame hinged thereon, a circular file mounted rotatably on said frame at its free end, means for rotating the saw-cylinder and of raising and lowering said frame and means for adjusting its angle to the base consisting of a rod connected by a moving joint to said frame and a lug on the base adapted to receive said rod and means for tightening said rod therein, for the purpose specified.

16. In a gin-saw gummer, a stand adapted to hold the machine in operative relation to the saw-cylinder, a frame hinged thereon, a circular file mounted rotatably on said frame at its free end, means for rotating the saw-cylinder and of raising and lowering said frame, means for adjusting its angle to the stand consisting of a rod slotted at its upper end, a stud on said frame passing through said slot and a lug on the base adapted to receive said rod and means for tightening said rod therein, for the purpose specified.

17. In a gin-saw gummer, a stand adapted to hold the machine in operative relation to the saw-cylinder, a frame hinged thereon, a circular file mounted rotatably on said frame at the free end, means for rotating the saw-cylinder and of raising and lowering said frame, means for adjusting its angle to the stand consisting of a rod slotted at its upper end, a stud on said frame passing through said slot, a lug on the base adapted to receive said rod and means for tightening said rod therein, a pin adjustable longitudinally of said rod and a pulling-spring secured to said pin at one end and to said stud at its other end, for the purpose specified.

18. In a gin-saw gummer, a stand adapted to sustain the machine in operative relation to the saw-cylinder, a gumming-tool adjustably mounted on said stand, a main shaft and means for operatively connecting said tool and shaft, a feed-lever fulcrumed on said stand and adapted to engage the teeth of the saw successively, a pin on the back end of said lever, an eccentric on said main shaft, a pitman connected to said eccentric and having a slot in its lower end in the form of an inverted L and thereby engaging said pin, for the purpose specified.

19. In a gin-saw gummer, a stand, a frame hinged thereto so as to be vibratable vertically and means for limiting the upward movement thereof, a gumming-tool operatively mounted on the free end of said frame and adapted to move into and out of the saw-teeth on the vibration of said frame, a link pendent from said frame, a feed-lever fulcrumed on said pendent link, means thereon for engaging the saw-teeth successively and means for oscillating said feed-lever, for the purpose specified.

20. In a gin-saw gummer, a stand, a frame hinged thereto so as to be vibratable vertically and means for limiting the upward movements thereof, a gumming-tool operatively mounted on the free end of said frame by means of a sliding bearing and adapted to move into and out of the saw-teeth on the vibration of said frame, a link pendent from said frame, a feed-lever fulcrumed on said pendent link, means thereon for engaging the saw-teeth successively and means for oscillating said feed-lever, an arm on said feed-lever, a slotted link carried on said arm and a pin on said sliding bearing to which said link engages by its slot, for the purpose specified.

21. In a gin-saw gummer, a stand, a frame hinged thereto so as to be vibratable vertically and means for limiting the upward movement thereof, a gumming-tool operatively mounted on the free end of said frame by means of the sliding bearing and adapted to move into and out of the saw-teeth on the vibration of said frame, a link pendent from said frame, a feed-lever fulcrumed on said pendent link, means thereon for engaging the saw-teeth successively and means for oscillating said feed-lever, an arm on said feed-lever, a slotted link carried on said arm, and a pin on said sliding bearing with which said link engages by its slot and an eccentric-sleeve on said pin substantially the same diameter as the width of said slot, for the purpose specified.

In testimony whereof I hereunto affix my signature in presence of two witnesses.

ALBERT A. WOOD.

Witnesses:
H. S. WESSON,
DAN W. IRBY.